(12) United States Patent
Derenzo et al.

(10) Patent No.: US 7,404,913 B2
(45) Date of Patent: Jul. 29, 2008

(54) CODOPED DIRECT-GAP SEMICONDUCTOR SCINTILLATORS

(75) Inventors: Stephen Edward Derenzo, Pinole, CA (US); Edith Bourret-Courchesne, Berkeley, CA (US); Marvin J. Weber, Danville, CA (US); Mattias K. Klintenberg, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/382,883

(22) Filed: May 11, 2006

(65) Prior Publication Data

US 2006/0219928 A1  Oct. 5, 2006

Related U.S. Application Data

(63) Continuation of application No. 10/662,944, filed on Sep. 15, 2003, now Pat. No. 7,048,872.

(60) Provisional application No. 60/411,491, filed on Sep. 16, 2002.

(51) Int. Cl.
*C09K 11/56* (2006.01)
*C09K 11/54* (2006.01)

(52) U.S. Cl. .................... 252/301.6 R; 252/301.6 S; 252/62.3 ZT; 252/62.3 R; 257/43; 257/102; 257/78

(58) Field of Classification Search .......... 252/301.6 R, 252/301.6 S, 62.3 ZT, 62.3 R; 257/43, 102, 257/78
See application file for complete search history.

(56) References Cited

U.S. PATENT DOCUMENTS

| 3,027,329 | A | * | 3/1962 | Grimmeiss et al. | ..... 252/301.4 R |
|---|---|---|---|---|---|
| 3,602,753 | A | * | 8/1971 | Evans et al. | .................. 313/467 |
| 5,976,412 | A | * | 11/1999 | Itoh et al. | ............. 252/301.4 R |
| 6,674,098 | B1 | * | 1/2004 | Niki et al. | .................... 257/102 |
| 7,048,872 | B2 | * | 5/2006 | Derenzo et al. | ....... 252/301.6 R |

FOREIGN PATENT DOCUMENTS

WO    WO 01/08229    *  2/2001

* cited by examiner

*Primary Examiner*—C. Melissa Koslow
(74) *Attorney, Agent, or Firm*—Lawrence Berkeley National Laboratory; Robin Chan Chiang; R'Sue Popowich Caron

(57) ABSTRACT

Fast, bright inorganic scintillators at room temperature are based on radiative electron-hole recombination in direct-gap semiconductors, e.g. CdS and ZnO. The direct-gap semiconductor is codoped with two different impurity atoms to convert the semiconductor to a fast, high luminosity scintillator. The codopant scheme is based on dopant band to dopant trap recombination. One dopant provides a significant concentration of carriers of one type (electrons or holes) and the other dopant traps carriers of the other type. Examples include CdS:In,Te; CdS:In,Ag; CdS:In,Na; ZnO:Ga,P; ZnO:Ga,N; ZnO:Ga,S; and GaN:Ge,Mg.

2 Claims, 5 Drawing Sheets

CODOPED DIRECT-GAP SEMICONDUCTOR SCINTILLATORS

CROSS-REFERENCE TO RELATED APPLICATIONS

This application claims priority of Provisional Application Ser. No. 60/411,491 filed Sep. 16, 2002, which is herein incorporated by reference. This application is a continuation of U.S. patent application Ser. No. 10/662,944, filed Sep. 15 2003, now U.S. Pat. No. 7,048,872, which is incorporated by reference herein.

STATEMENT OF GOVERNMENTAL SUPPORT

The United States Government has rights in this invention pursuant to Contract No. DE-AC03-76SF00098 between the United States Department of Energy and the University of California.

BACKGROUND OF THE INVENTION

The invention relates to scintillators, and more particularly to fast, bright inorganic scintillators based on direct-gap semiconductors.

Inorganic scintillators have been used as radiation detectors for x-rays, gamma rays, and neutrons, for over a century. The history of inorganic scintillators is described in S. E. Derenzo et al., "The Quest for the Ideal Inorganic Scintillator," Nuclear Instruments and Methods in Physics Research A 505 (2003) 111-117, which is herein incorporated by reference.

Table I lists the best available prior art scintillators and compares them to the ideal.

measuring regional biochemical and physiological functions. It has been useful for the study of heart disease, brain disease, and cancer. However, PET has been limited by the timing and energy resolution of available scintillators. A scintillator with properties close to the fundamental limits of 1 ns decay time, 200 ps fwhm timing resolution, and 3% fwhm energy resolution would substantially improve PET performance. Thus a new inorganic scintillator for detecting 511 keV photons with exceptional detection efficiency (like BGO), response time (1 ns), and energy resolution (3% fwhm) would allow septaless time-of-flight PET to be achieved. Fast bright scintillators could also enable an efficient time-of-flight gamma detector useful in other fields, such as nuclear physics, high energy physics, and astrophysics.

SUMMARY OF THE INVENTION

Accordingly, it is an object of the invention to provide an improved fast bright inorganic scintillator that is operative at room temperature.

The invention is a new class of inorganic scintillators based on direct-gap semiconductors. The direct-gap semiconductor is codoped with two different impurity atoms to convert the semiconductor to a fast, high luminosity scintillator. The codopant scheme is based on dopant band to dopant trap recombination. One dopant provides a significant concentration of carriers of one type (electrons or holes) and the other dopant traps carriers of the other type. Thus one dopant produces lots of one carrier (e.g. electrons) and the other dopant traps the other carrier (e.g. holes). The direct-gap semiconductor codoped with the two types of impurity atoms converts ionization energy into fast scintillation light with high efficiency at room temperature.

TABLE I

| Properties | BGO | Nd:Tl | BaF$_2$ | LSO | LaBr$_3$:Ce | Ideal |
|---|---|---|---|---|---|---|
| photoelectric fraction* | 0.43 | 0.18 | 0.19 | 0.34 | 0.14 | >0.43 |
| Density | 7.1 | 3.7 | 4.9 | 7.4 | 5.3 | >7 |
| Photon/MeV | 8,200 | 40,000 | 1,800 | 20,000 | 61,000 | >100,000 |
| Energy resolution** | 13% | 6% | 10% | 11% | 3% | <3% |
| Decay time (ns) | 300 | 230 | <1 | 40 | 35 | <1 |
| Photons/ns/MeV*** | 26 | 180 | 2000 | 500 | 1750 | >100,000 |

*$\sigma_{photo}/(\sigma_{photo} + \sigma_{Compton})$ at 511 keV
**fwhm at 511 keV
***Photons/ns/MeV* = (photons/MeV)/(decay time)

FIG. 1 shows the physical processes active in the various common prior art scintillators. These include self-trapped excitonic scintillators such as BaF$_2$; scintillators with activator ions such as NaI(Tl), CsI(Tl), LSO (Lu$_2$SiO$_5$:Ce), and LaBr$_3$:Ce: self-activated scintillators such as BGO (Bi$_4$Ge$_3$O$_{12}$); and core-valence scintillators such as BaF$_2$. Certain phosphors have ultra-fast decay times, e.g. 0.7 ns for ZnO:Ga and 0.2 ns for CdS:In. Unfortunately, no known inorganic scintillator is both bright and fast.

Direct-gap semiconductors are fast, luminous scintillators when cooled to cryogenic temperatures, but have greatly reduced luminosity at room temperature due to carrier trapping on non-radiative centers (crystal defects and impurities). The need for cryogenic temperatures limits their use. A scintillator that is bright and fast at room temperature is desired.

Positron Emission Tomography (PET) is able to measure the concentration of labeled compounds in the human body as a function of time and is an efficient and accurate method for The scintillator material of the invention is generally described by the formula S:X,Y where S is a direct-gap semiconductor, and X and Y are the codopants. The dopants are generally introduced at the 0.1 mole % to 0.2 mole % level, but can more generally range from 0.01 mole % to 1 mole %. The dopant band to dopant trap recombination mechanism can be implemented in four different embodiments by the selection of appropriate dopants X, Y.

These embodiments are: 1. Donor band to acceptor trap recombination in which the donor dopant produces electrons in a donor band, e.g. becomes bulk n-type, and the acceptor dopant traps holes until they recombine with the electrons in the donor band. 2. Acceptor band to donor trap recombination in which holes are produced in an acceptor band by the acceptor dopant, e.g. bulk p-type material, and recombine with electrons trapped on donor dopant atoms. 3. Donor band to isoelectronic (isovalent) hole trap recombination, similar to type 1 but the holes are trapped on an isoelectronic impurity atom. 4. Acceptor band to isoelectronic electron trap recombination, similar to type 2 but the electrons are trapped on an isoelectronic impurity atom. The first type is generally preferred.

Specific scintillator materials of the invention include CdS doped with any of In, Ga, or Al and codoped with any of Te, Ag, Na or Li. CdS:In,Te is an example of type 3 and CdS:In, Ag; CdS:In,Na; and CdS:In,Li are examples of type 1. ZnO doped with Ga and codoped with any of P, N, or S is another specific scintillator material of the invention. ZnO:Ga,P and ZnO:Ga,N are examples of type 1 and ZnO:Ga,S is an example of type 3. GaN codoped with Ge, Si, S or Se, and Mg are other examples of type 1. ZnTe doped with Mg forms type 2, 4 materials when codoped with a suitable trap.

DETAILED DESCRIPTION OF THE INVENTION

The invention is an improved inorganic scintillator based on a direct-gap semiconductor into which two different impurity atoms or dopants are introduced. By selecting one foreign atom to provide a carrier band and the other foreign atom to provide for efficient trapping of the other carrier, rapid radiative recombination occurs, providing a fast luminous scintillation mechanism.

The codoped direct-gap semiconductor scintillators work on the basis of radiative electron-hole recombination. One dopant provides an abundant supply of charge carriers of one type (electrons or holes). The other dopant promptly and efficiently traps the other type of charge carrier (holes or electrons, respectively) produced by the ionizing radiation. The first dopant is a neutral donor or acceptor to provide an abundant supply of either electrons or holes. The second dopant can be an ionized acceptor atom (to trap holes), an ionized donor atom (to trap electrons), or an isoelectronic trap (of holes or electrons), depending on the first dopant.

For example, an electron donor (n-type) dopant provides a band of electrons near the bottom of the conduction band that rapidly combine with holes produced by an ionization event to produce scintillation light with a very short decay time. But with only a single electron donor dopant, trapping of ionization holes on nonradiative centers limits room temperature luminosity. However, the addition of the second dopant to efficiently trap the holes produced in the ionization event allows the holes to combine radiatively with the donor band electrons, producing scintillation with short decay time and high luminosity (brightness).

Figure 1:
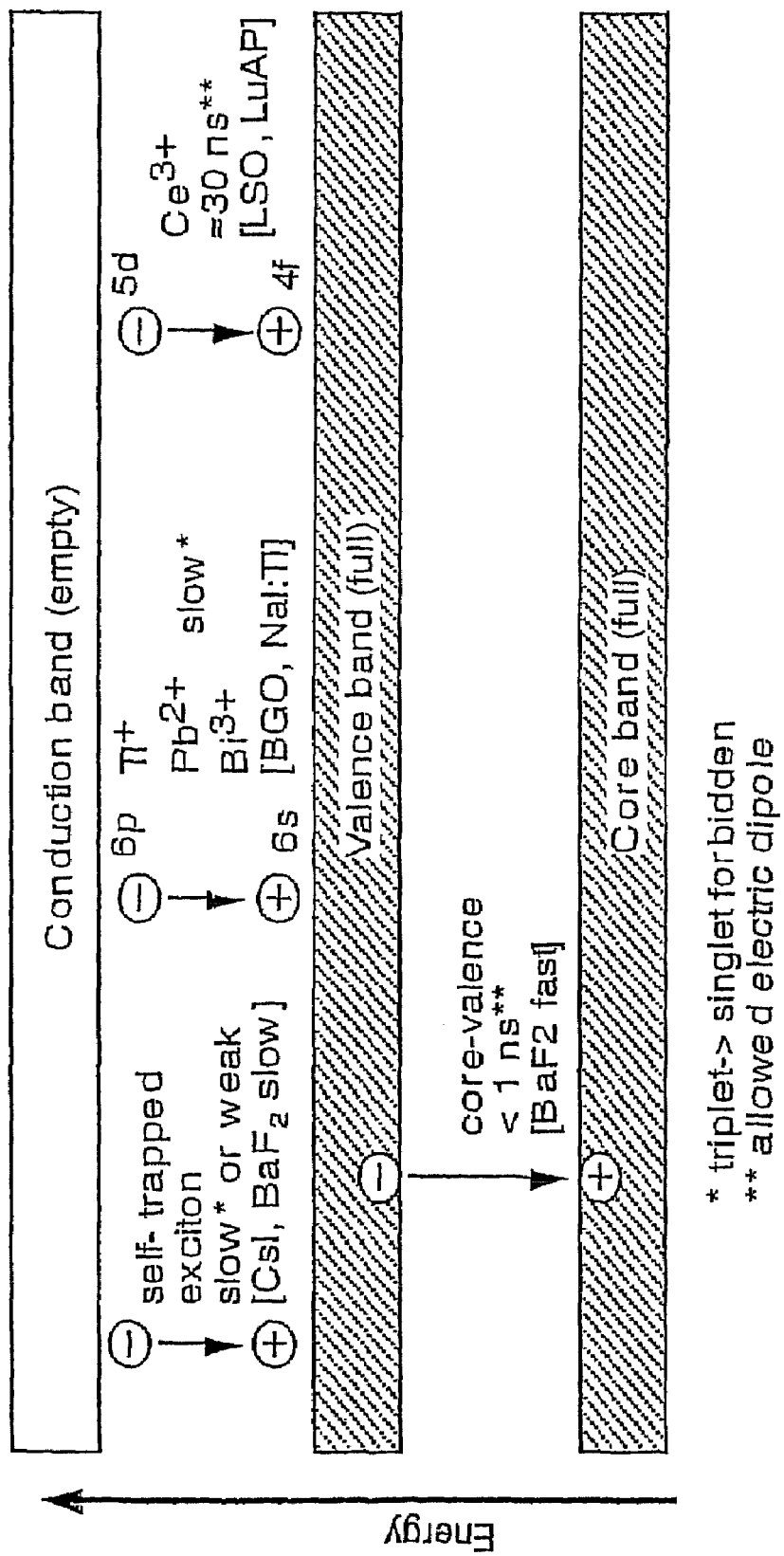
FIG. 1 is a schematic energy level diagram for the common scintillation mechanisms of prior art scintillators.
Figure 2:
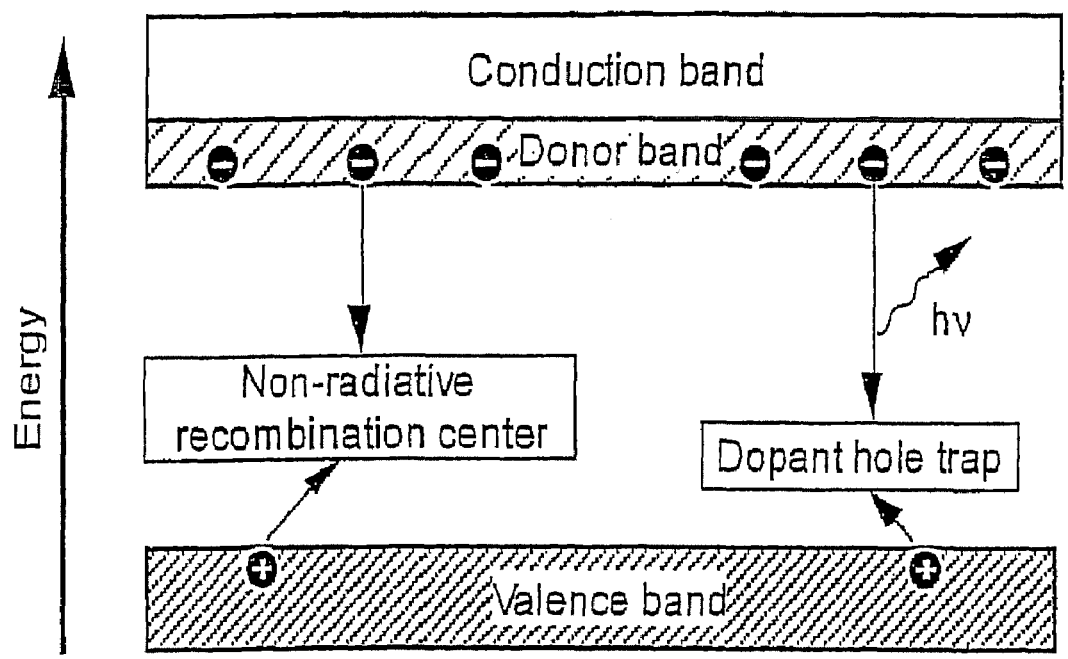
FIGS. 2-3 are schematic energy level diagrams for the scintillation mechanisms of the present invention.
Figure 3:
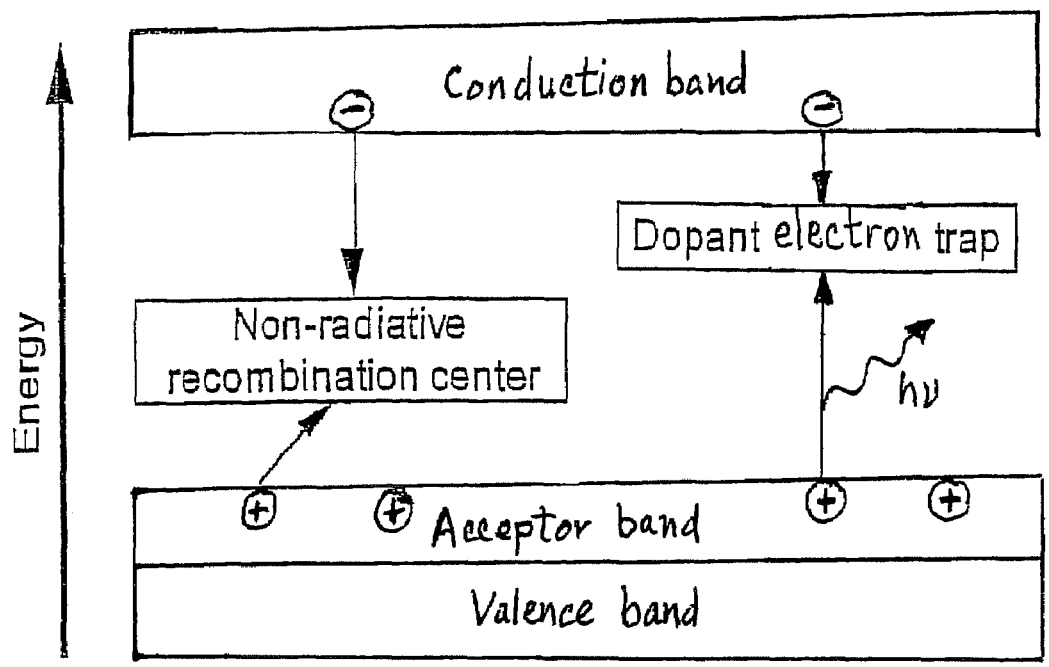

FIGS. 2-3 illustrate the scintillation mechanisms of the present invention.

In FIG. 2, a direct-gap semiconductor is codoped with (1) impurity atoms to provide a donor band of electrons, and (2) impurity atoms to trap ionization holes, for rapid radiative recombination. The second impurity may be an isoelectronic trap. High luminosity requires that the dopant hole traps are more efficient than the nonradiative recombination centers formed by crystal defects and impurities.

In FIG. 3, a direct-gap semiconductor is codoped with (1) impurity atoms to provide an acceptor band of holes, and (2) impurity atoms to trap ionization electrons, for rapid radiative recombination. The second impurity may be an isoelectronic trap. Again, for high luminosity, the dopant electron traps must be more efficient than the nonradiative recombination centers.

Thus the invention is implemented with a pair of dopants; one is a donor or acceptor of one charge carrier (i.e. either n-type or p-type doping), and the other is a trap for the other charge carrier. The mechanism of dopant band to dopant trap recombination can be carried out by donor band to acceptor trap recombination, acceptor band to donor trap recombination, or dopant band to isoelectronic trap recombination, depending on the particular dopants chosen.

In donor band-acceptor trap recombination, the direct-gap semiconductor is doped with impurity donor atoms to become bulk n-type. This requires the donor atom to have an ionization energy low enough, e.g. about 30 meV, to provide delocalized electrons in a donor band. The semiconductor is codoped with impurity acceptor ions that efficiently trap holes produced by ionizing radiation until they recombine radiatively with the electrons in the donor band. This requires the acceptor atom to have an ionization level low enough, e.g. <about 200 meV, for efficient hole trapping but high enough, e.g. >about 50 meV, to avoid thermal trapping before radiative recombination occurs. The level of nonradiative centers should be sufficiently low to avoid interference.

In acceptor band-donor trap recombination, the direct-gap semiconductor is doped with impurity acceptor atoms to become bulk p-type. This requires the acceptor atom to have an ionization energy low enough, e.g. about 30 meV, to provide delocalized holes in an acceptor band. The semiconductor is codoped with impurity donor ions that efficiently trap electrons produced by ionizing radiation until they recombine radiatively with the holes in the acceptor band. This requires the donor atom to have an ionization level low enough, e.g. <about 200 meV, for efficient electron trapping but high enough, e.g. >about 50 meV, to avoid thermal trapping before radiative recombination occurs. The level of nonradiative centers should be sufficiently low to avoid interference.

Dopant band to isoelectronic trap recombination, is similar to the above but the trap is an isoelectronic trap that localizes either the electron or hole on a single atom.

Specific requirements for the invention, in particular for an improved scintillator for PET, include the following.

A. The semiconductor has a high atomic number and high density (similar to BGO) so that the 511 keV annihilation photons lose all their energy by photoelectric absorption in a small detector volume with high probability. This is important because it provides a combination of fine spatial resolution and high detection efficiency. Semiconductors have relatively low melting points, and this contributes to low crystal production cost.

B. The semiconductor has a band-gap above about 2 eV so that scintillation light can be detected by photomultiplier tubes.

C. The semiconductor has a direct gap, which means that the momentum space vectors of an electron at the bottom of the conduction band and a hole at the top of the valence band are equal, and no transfer of momentum to the lattice is needed to generate an optical photon. Direct-gap semiconductors include ZnO, CdS, PbI2, HgI2, CuI, ZnTe, and GaN.

D. One impurity consists of donor ions with excess positive charge compensated with a band of electrons near the bottom of the conduction band (FIG. 2) or acceptor ions with excess negative charge compensated by a band of holes near the top of the valence band (FIG. 3).

E. The other impurity consists of ions that promptly and efficiently trap ionization holes (FIG. 2) or electrons (FIG. 3) until they can radiatively recombine with the donor band electrons or acceptor band holes respectively.

The scintillator material of the invention is generally described by the formula S:X,Y where S is a direct-gap semiconductor, and X and Y are the codopants. There are four variations of the donor band to donor trap recombination mechanism, depending on the particular dopants X, Y selected: 1. Donor band to acceptor trap recombination in which the donor dopant produces electrons in a donor band, e.g. becomes bulk n-type, and the acceptor dopant traps holes until they recombine with the electrons in the donor band. 2. Acceptor band to donor trap recombination in which holes are produced in an acceptor band by the acceptor dopant, e.g. bulk p-type material, and recombine with electrons trapped on donor dopant atoms. 3. Donor band to isoelectronic (isovalent) hole trap recombination, similar to type 1 but the holes are trapped on an isoelectronic impurity atom, i.e. the valence of the dopant is the same as the valence of the atoms it replaced. 4. Acceptor band to isoelectronic electron trap recombination, similar to type 2 but the electrons are trapped on an isoelectronic impurity atom. The dopants are generally introduced at the 0.1 mole % to 0.2 mole % level, but can more generally range from 0.01 mole % to 1 mole %. The amount of each dopant may be different.

CdS doped with any of In, Ga, or Al and codoped with any of Te, Ag, Na or Li is one particular direct-gap semiconductor scintillator material of the invention. CdS:In,Te is an example of type 3 and CdS:In,Ag; CdS:In,Na; and CdS:In,Li are examples of type 1. ZnO doped with Ga and codoped with any of P, N, or S is another particular direct-gap semiconductor scintillator material of the invention. ZnO:Ga,P and ZnO:Ga,N are examples of type 1 and ZnO:Ga,S is an example of type 3. GaN codoped with any of Ge, Si, S, and Se, and with Mg are other examples of type 1. ZnTe doped with Mg can be used to form type 2 and 4. The Mg dopant is an acceptor; a suitable donor electron trap or isolectronic electron trap is required as a codopant.

A particular example (of type 1) is ZnO:Ga,P where the direct gap semiconductor ZnO is codoped with Ga and P. The Ga dopant produces an abundant supply of electrons while the P codopant traps holes. Holes produced by ionizing radiation are promptly trapped on trivalent phosphorous ions and recombine with abundant electrons produced by the gallium.

Another example (of type 3) is CdS:In,Te where the direct gap semiconductor is CdS and the codopants are In and Te. Indium is an electron donor and tellurium is an isoelectronic hole trap. Indium makes the material bulk n-type which provides a band of donor electrons near the bottom of the conduction band. When an electron or x-ray produces holes and electrons in the material, many of the holes are promptly trapped in less than 0.05 ns on tellurium atoms and then recombine with electrons from the donor band to produce scintillation light with a decay time of 3.3 ns.

Figure 4:
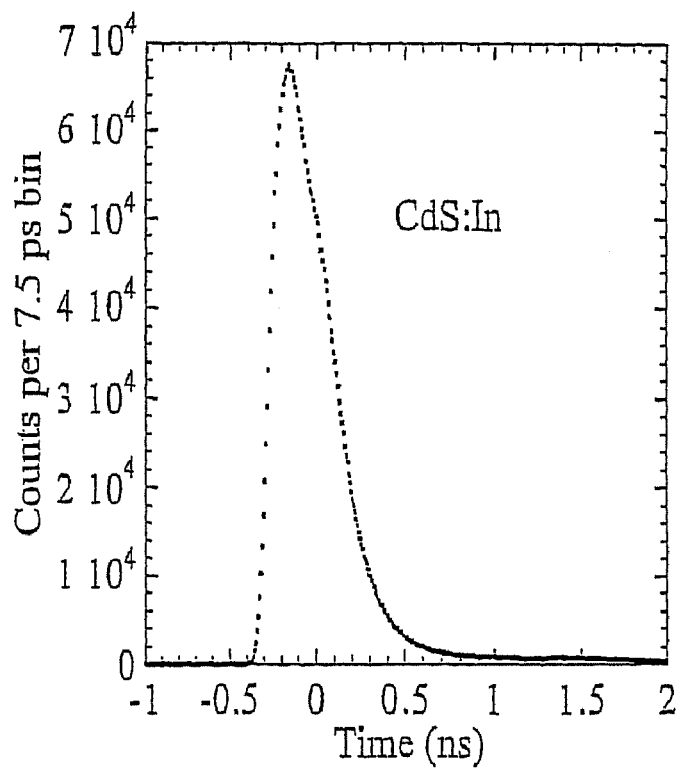
FIGS. 4-6 respectively are the room temperature time spectra of CdS:In (prior art), CdS:Te (prior art), and CdS:In,Te of the present invention.
Figure 5:
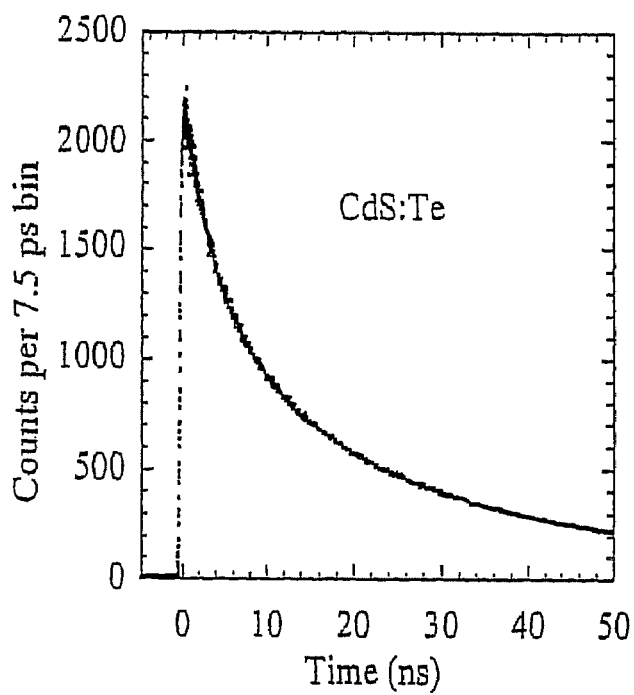
Figure 6:
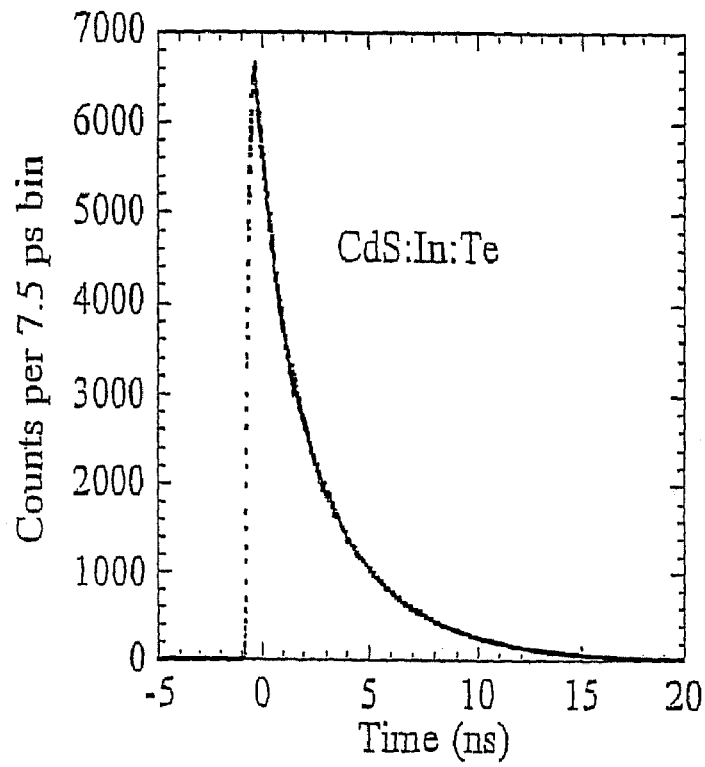
Figure 7:
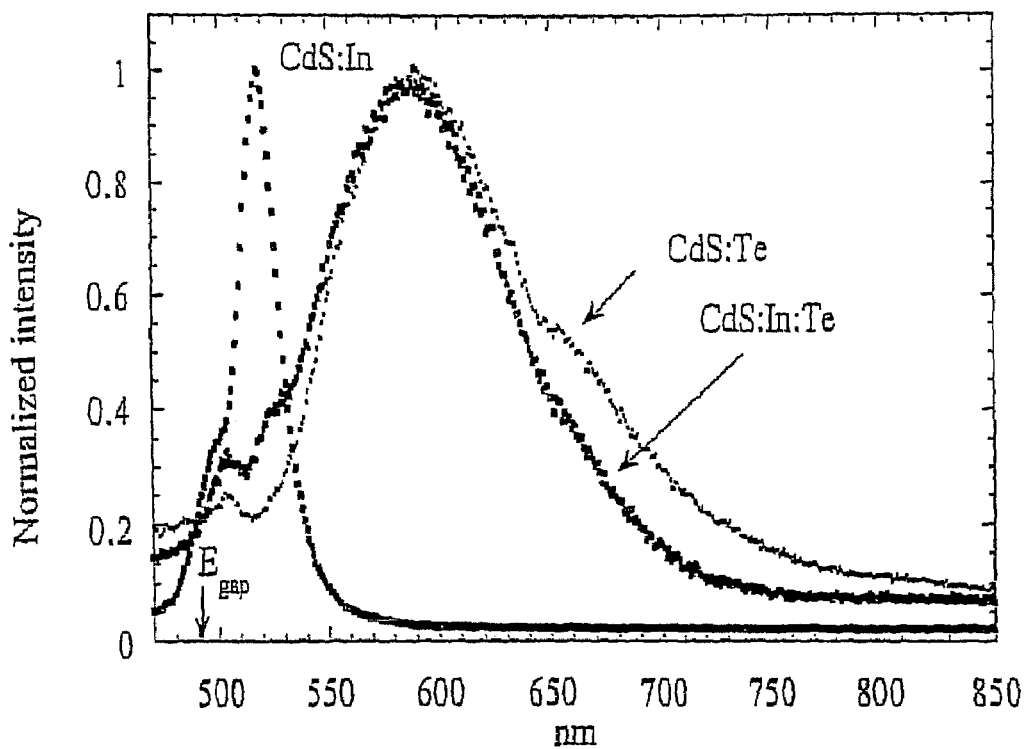
FIG. 7 is the room temperature wavelength spectrum of CdS:In, CdS:Te, and CdS:In,Te.

The room temperature time spectra of CdS:In, CdS:Te, and CdS:In,Te are shown in FIGS. 4-6 respectively. CdS:In has a fast decay time, 0.2 ns, but has low luminosity at room temperature. CdS:Te has a slow decay time of 3 μs. The codoped CdS:In,Te has a fast decay time of 3.3 ns and retains the emission wavelength of CdS:Te as shown in FIG. 7.

Figure 8:
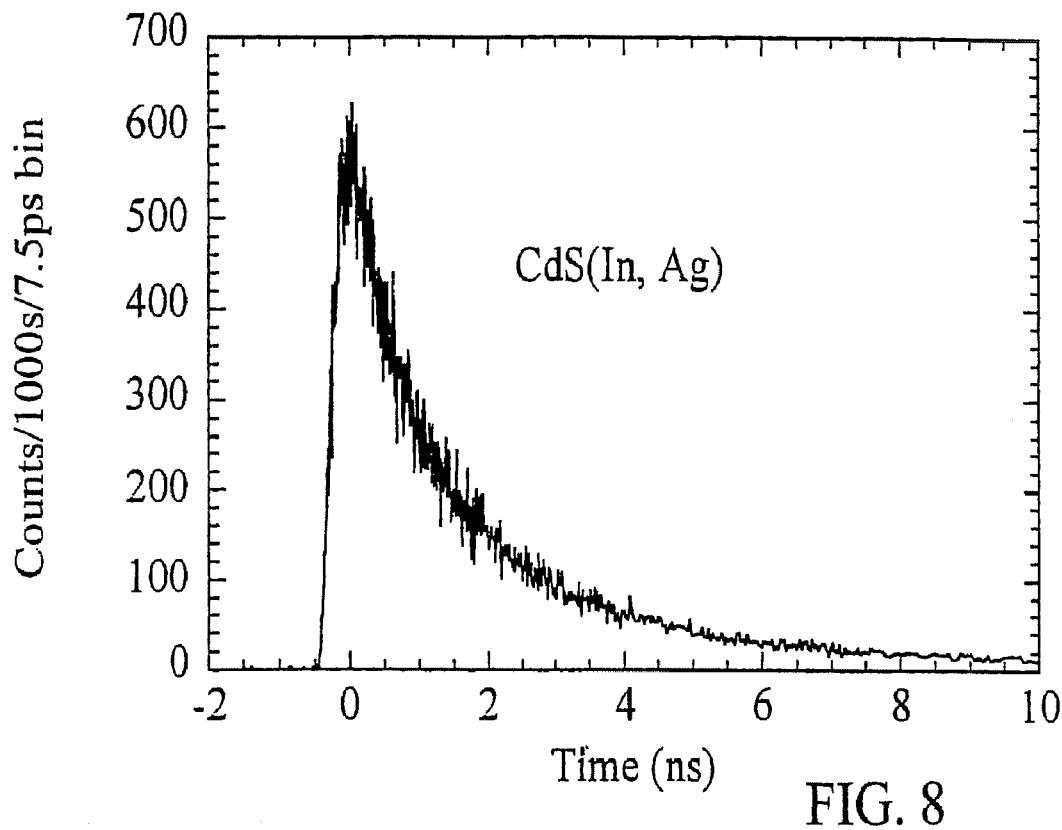
FIGS. 8-9 respectively are the room temperature time spectra of CdS:In,Ag and CdS:In,Na of the present invention.
Figure 9:
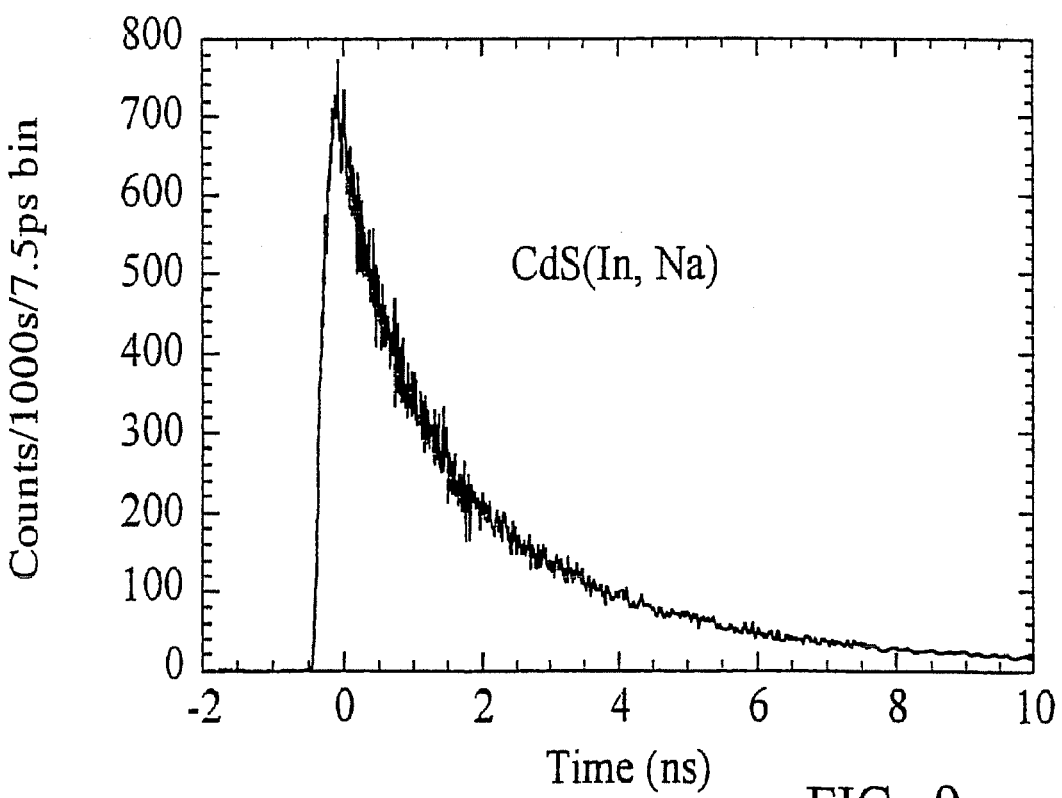

FIGS. 8-9 respectively are the room temperature time spectra of CdS:In,Ag and CdS:In,Na of the present invention. The codoped CdS:In,Ag has a fast decay time of 1.6 ns compared with >5 μs for CdS:Ag, and the same emission wavelength.

The codoped semiconductor scintillator materials of the invention can be made by known methods. U.S. Pat. No. 3,534,211 to Lehmann describes a method for producing n-type ZnO (singly) doped with Ga, In, or Al. The method can be adapted to make the codoped materials of the present invention by simply adding both dopants in place of the single dopant. For example, ZnO(Ga,P) has been prepared by a modified Lehmann process by incorporating 0.2 mole % of GaP into the ZnO+0.3 mole % Ga2O3 mix at the beginning of the process.

An alternative process to reliably produce (singly doped) ZnO(Ga) with thirty times higher conversion efficiency than the Lehmann process is carried out as follows. This process uses non-aqueous thermally induced diffusion and avoids the more complicated aqueous chemistry of Lehmann.

1. Commercially available high purity (5N) ZnO powder is mixed with 0.001 mole % to 1 mole % [or 0.1 to 0.2 mole %] high purity (5N) Ga2O3.

2. The Ga2O3 is incorporated into the ZnO by adding methanol and grinding in an alumina mortar and pestle for typically 15 minutes until the mixture appears dry.

The mixture is then transferred to a glass container and placed in an oven at 120° C.to dry completely for at least 10 minutes.

The mixture is heated in a furnace at 1100° C. in a loosely capped container in vacuum (using a mechanical vacuum pump) for 10 to 15 hours.

5. The mixture is cooled down to room temperature, removed from the container and ground dry with the mortar and pestle.

The mixture is heated in a furnace at 900° C. in a loosely capped container in vacum (using a mechanical vacuum pump) for 10 to 15 hours.

7. The mixture is cooled down to room temperature, removed from the container and subjected to a light dry grinding with the mortar and pestle The mixture is heated in a furnace at 800° C. in a loosely capped container in flowing forming gas (3% hydrogen/97% Argon) for 30 minutes.

This process for making a material with a single dopant can again be readily adapted to the present invention to make codoped materials by simply adding both dopants in place of the single dopant in step 1.

Samples of CdS(In; Te, Ag or Na) were prepared from CdS powder (Strem Chemicals, 99.999% Puratrem), In powder 325 mesh (Alfa Aesar, 99.999% Puratronic), CdTe powder (Strem Chemicals, 99.999%), $Ag_2$ S powder, and NaCl powder. CdS(In) was prepared by incorporating 1% In into CdS by: (1) mixing the dry powders in a vortex mixer, (2) sealing the result in a quartz ampoule under vacuum with a residual pressure of $5 \times 10^{-5}$ torr, (3) placing the ampoule in a tube furnace at 900° C. for 10 hours, (4) cooling the ampoule at a rate of about 200° C. /hour, (5) crushing the resulting material into a fine powder using a mortar and pestle, and (6) repeating steps (2) to (5). CdS(Te), CdS(Ag), and CdS(Na) were prepared by incorporating 0.01% CdTe, 0.05% $Ag_2$S, or 0.05% NaCl , respectively, into CdS using steps (1) to (5). CdS(In, Te), CdS(In,Ag), CdS(In,Na) were prepared by combining equal amounts of CdS(Te), CdS(Ag), or CdS(Na), respectively, and CdS(In) and performing steps (1) to (5). [All dopant percentages are mole fractions.]

The invention is useful for the detection of ionizing radiation where fast response and high data rates are important.

Applications include medical imaging, nuclear physics, nondestructive evaluation, treaty verification and safeguards, environmental monitoring, and geological exploration. In particular, the new inorganic scintillator will allow septaless time-of-flight PET to be achieved. This will be a major improvement, providing much finer resolution, higher maximum event rates, and clearer images.

Changes and modifications in the specifically described embodiments can be carried out without departing from the scope of the invention which is intended to be limited only by the scope of the appended claims.

We claim:

1. A method of making a codoped semiconductor scintillator material, comprising the steps of:
   blending high purity ZnO powder with 0.2 mole % high purity GaP and 0.3 mole % high purity $Ga_2O_3$ powder to form a mixture;
   grinding the mixture;
   heating the mixture at 1100 ° C. in vacuum for 10 to 15 hours;
   grinding the mixture;
   heating the mixture at 900 ° C. in vacuum for 10 to 15 hours;
   grinding the mixture; and
   heating the powder in flowing forming gas at 800 ° C. for 30 minutes.

2. A method of making a codoped CdS semiconductor scintillator material, comprising the steps of:
   providing a first quantity of high purity CdS powder;
   providing a high purity In dopant powder having a first carrier type;
   blending the first quantity of the CdS powder and 1 mole % of the In dopant powder together to form a first mixture;
   heating the first mixture under vacuum with a residual pressure of $5 \times 10^{-5}$ torr at 900° C. for 10 hours;
   cooling the first mixture at a rate of 200° C./hr;
   grinding the first mixture;
   providing a second quantity of high purity CdS powder;
   providing a high purity second dopant powder having a second carrier type, wherein the second dopant is selected from the group consisting of 0.01 CdTe, 0.05 mole % $Ag_2S$, and 0.05 mole % NaCl;
   blending the second quantity of the CdS powder and the second dopant powder together to form a second mixture;
   heating the second mixture under vacuum with a residual pressure of $5 \times 10^{-5}$ torr at 900° C. for 10 hours;
   cooling the second mixture at a rate of 200° C./hr;
   grinding the second mixture;
   blending equal amounts of the first mixture and the second mixture together to form a third mixture;
   heating the third mixture under vacuum with a residual pressure of $5 \times 10^{-5}$ torr at 900° C. for 10 hours;
   cooling the third mixture at a rate of 200° C./hr; and
   grinding the third mixture.

* * * * *